United States Patent [19]

Katahira

[11] Patent Number: 4,840,077
[45] Date of Patent: Jun. 20, 1989

[54] BALL SCREW APPARATUS

[75] Inventor: Masayuki Katahira, Maebashi, Japan

[73] Assignee: Nippon Seiko Co., Ltd., Tokyo, Japan

[21] Appl. No.: 172,226

[22] Filed: Mar. 23, 1988

[30] Foreign Application Priority Data

Mar. 25, 1987 [JP] Japan .............................. 62-43782[U]

[51] Int. Cl.$^4$ ........................ F16H 25/22; F16H 25/24
[52] U.S. Cl. ....................... 74/424.8 NA; 74/424.8 R; 74/441; 74/458; 74/606 A
[58] Field of Search ................ 74/424.8 R, 424.8 NA, 74/89.15, 441, 458, 606 A

[56] References Cited

U.S. PATENT DOCUMENTS

| 3,059,494 | 10/1962 | Grabouski et al. | 94/424.8 R X |
| 3,171,295 | 3/1965 | Benckert | 74/424.8 R |
| 4,593,572 | 6/1986 | Linley, Jr. | 74/441 X |

Primary Examiner—Allan D. Herrmann
Attorney, Agent, or Firm—Oblon, Spivak, McClelland, Maier & Neustadt

[57] ABSTRACT

This invention provides a ball screw apparatus complying with high-cleanliness specifications insofar as the apparatus has an axial through hole open at one end of the shaft and a large number of smaller holes on the periphery of the shaft which communicate with the hole, and an air sucking mechanism having a port communicating with the axial hole on the shaft so as to apply a negative pressure to the axial hole thereof. The shaft of this ball screw apparatus acts as a sucking duct so as to allow the use of ordinary grease lubrication even within a clean-room without the necessity of changing lubrication conditions depending on the type of greases. It can effectively prevent contamination of the surrounding area by the forcible sucking of dispersed grease particles, cooling the shaft with the stream of sucked air to prevent faults due to thermal expansion, and is most suitable for a ball screw apparatus of the machines and tools installed in clean-rooms and semiconductor manufacturing plants where dust presents a critical problem.

7 Claims, 2 Drawing Sheets

BALL SCREW APPARATUS

BACKGROUND OF THE INVENTION

1. Field of the Invention

The present invention relates to a ball screw apparatus and more particularly to a ball screw apparatus with a function of preventing dust from dispersing which is most suitable for application to devices installed in clean-rooms.

2. Discussion of the Background

A mechanism using a ball screw apparatus generally has a problem with respect to the atmospheric contamination in a clean-room as it inevitably produces iron powder dust and particles of lubricating grease due to the sliding contact between a nut and a screw shaft. The prior art ball screw apparatuses specified for such clean-rooms are lubricated with greases of low volatility and dispersion to prevent dust or oil from dispersing by vaporization. Alternatively, the device incorporating a ball screw apparatus as a whole or the moving system or feeding system thereof such as a reciprocating table is covered, and the dust is sucked in vacuum from inside of the cover.

The aforementioned measures taken in the prior art by the use of grease specified for high vacuum instead of general purpose grease, however, cannot effectively prevent dust dispersion where a high degree of cleanliness is required such as inside semiconductor manufacturing plants. Moreover, feeding characteristics are impaired by changes in lubrication to present problems in rust preventive properties or durability. The prior art means utilizing vacuum suction is defective as the reciprocating table or the feeding system as a whole should be housed in a case to thereby inconveniently increase the size of the system including the suction pump, and to increase the cost. As the cover expands/contracts, the cover produces dust by friction to further deteriorate the situation.

SUMMARY OF THE INVENTION

This invention aims at providing a ball screw apparatus which incorporates a dust suction function integrally on a shaft thereof to thereby allow the ball screw apparatus to be compact in size, to eliminate such frictional or expansional portion as used in the prior art ball screws for securing a cover and to simultaneously achieve a cooling effect on the shaft by suction air.

The above object of this invention is attained by a ball screw apparatus comprising a ball screw shaft having a spiral thread on the outer surface thereof, a ball screw nut having a spiral thread on the inner surface thereof corresponding to the thread on said shaft, and a plurality of balls engaged in a freely rotatable manner in the spiral threads of said ball screw nut and of said ball screw shaft which is characterized in that said ball screw shaft has an axial hole open at an end thereof and a plurality of narrow holes open at the outer periphery thereof to communicate with said hole, and that an air suction means is provided so as to apply a negative pressure inside the axial hole by sucking the air from a suction port communicating with the axial hole.

In ball screw apparatus according to the present invention, a large number of small holes are bored radially on the thread (i.e. a spiral groove) which communicate with the through hole bored in the axial direction of the shaft (an axial hole) so that when the air in the through hole is sucked by a suction pipe connected with the through hole of the shaft, air on or near the outer periphery of the shaft is also sucked into the hole via the narrow holes provided on the thread. Even if oil particles in the grease are adhered on the nut of the screw shaft are evaporated or dust is produced by rotational movement of the balls, these oil particles and dust are sucked through the narrow holes on the shaft into the hole instead of being dispersed into the air. As the outside air is sucked in through the narrow holes on the shaft, the shaft is effectively cooled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
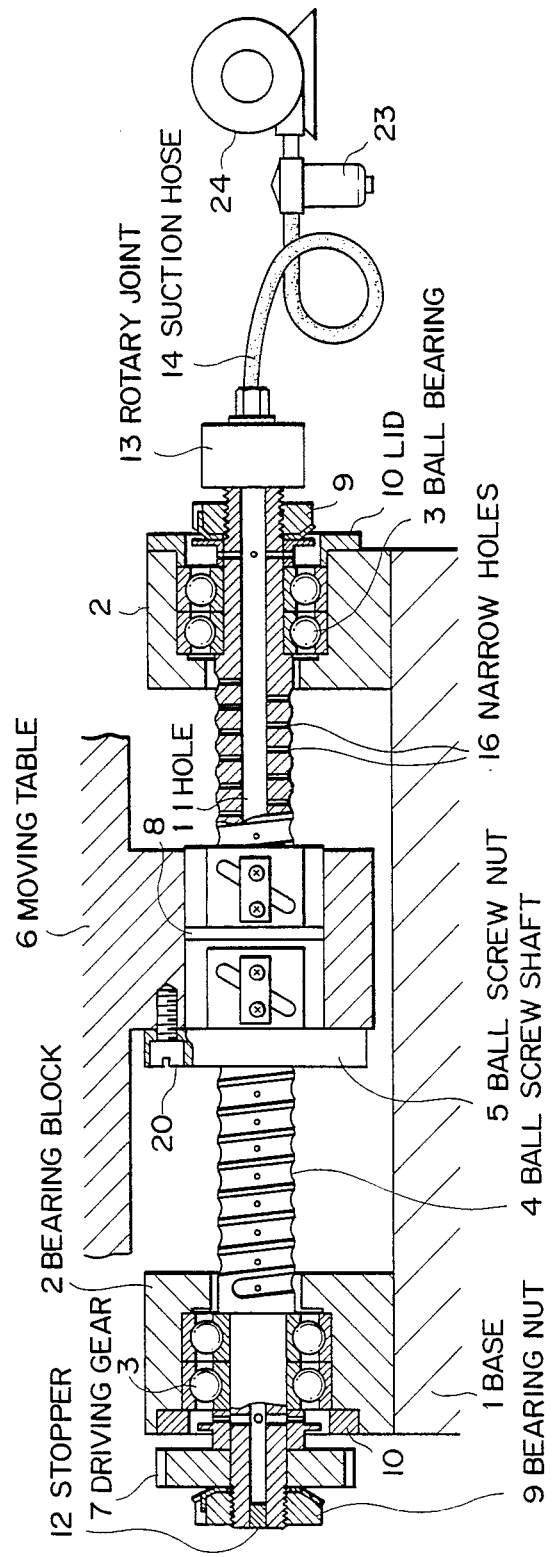
FIG. 1 is a sectional view to partially show an embodiment of the ball screw apparatus according to the present invention.
Figure 2:
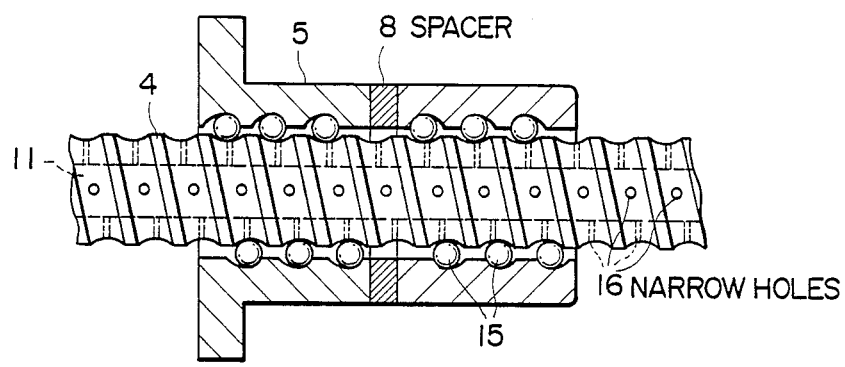
FIG. 2 is an enlarged sectional view to show internal structure of the ball screw apparatus shown in FIG. 1.

The first embodiment of this invention is described by referring to FIGS. 1 and 2 wherein a pair of bearing blocks 2, 2 are fixed on a base 1 and a ball screw shaft 4 is supported in a freely rotatable fashion on both ends of the bearing blocks 2 via ball bearings 3. On a moving table 6 supported by a reciprocating guide (not shown) is attached, by a fastening screw 20, a ball screw nut (i.e. double-nut having a flange on one side) 5 which is to be mated with the ball screw shaft 4 by a plurality of balls 15. When a driving gear 7 attached to an end of the shaft 4 is rotated by a driving means such as a motor, the shaft 4 is rotated to mate the nut with the shaft 4 and advances the shaft 4 in the axial direction to move the table 6 linearly in the axial direction. Reference numeral 8 denotes a spacer for pre-loading adjustment (see FIG.2) between the double-nut, 9 indicates bearing nuts provided on the ends of the shaft, and 10 indicates a lid member which secures the outer ring of the ball bearings 3.

The ball screw shaft of this invention is bored so as to have an axial hollow portion. In the embodiemnt, the axial hollow portion is formed as a through hole 11 along the entire length thereof, and the hole 11 is sealed with a stopper 12 at one end thereof and connected to a sucking port of a suction hose (i.e. a suction pipe) 14 on the other end via a rotary joint 13. A large number of narrow holes 16 are bored in the radial direction on the bottom of the spiral groove of the shaft 4 at an interval of substantially 90° at the center angle (four holes are bored in cross section per pitch along the groove) in a manner to communicate with said through hole 11. As the narrow holes 16 are situated on the bottom of the grooves, if two ball screw nuts are pre-loaded in the axial direction for use, they are not located on the rotating portions of the balls so as not to disturb rotation thereof. The location thereof is further advantageous as the number of processing steps can be reduced. The suction hose 14 is connected to a gas suction mechanism such as a vacuum pump 24. Said suction hose and vacuum pump form gas suction means which applies a negative pressure to the inside of the axial hole 11 of said ball screw shaft. A filter 23 for cleaning the sucked air may be provided at a location between the shaft end and the vacuum pump 24 of the gas suction means, if necessary.

Figure 4:
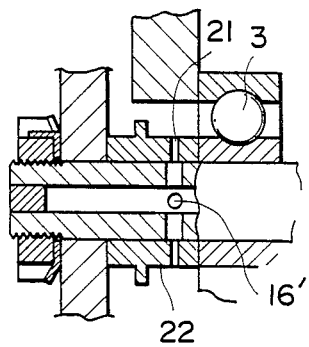
FIG. 4 is an enlarged sectional view to show an end of the shaft of the ball screw apparatus shown in FIG. 1.

Said vacuum pump is activated while the ball screw shaft is being rotated to suck the air from the through hole 11 of said shaft 14 via the hose 14. The dust (i.e. iron dust) generated by the friction between the grooves and balls when the balls 15 roll in the spiral groove between the shaft 4 and the nut 5 or particles of oil vaporized from the grease applied on the spiral groove are sucked into the narrow holes 16 on the groove and exhausted outside or adsorbed by the filter 23 via the hole 11 and the hose 14. The polluted air and dispersed dust outside the nut or around the shaft are also sucked via the narrow holes 16 on the shaft 4 protruding from the nut 5 to thereby prevent contamination of the atmospheric air. As the air surrounding the shaft is forcibly sucked and exhausted through the inside of the shaft, the air flow contributes to suppression of heat which otherwise is generated by driving of the ball screw. As shown in FIG. 4, a narrow hole 21 is bored on a collar 22 which holds the inner ring of the ball bearing 3 on the end of the shaft to communicate with a narrow hole 16' near the end. The narrow hole 16' and the narrow hole 21 on the collar are aligned so as to suck the air located close to the end of the ball bearing 3.

Figure 3:
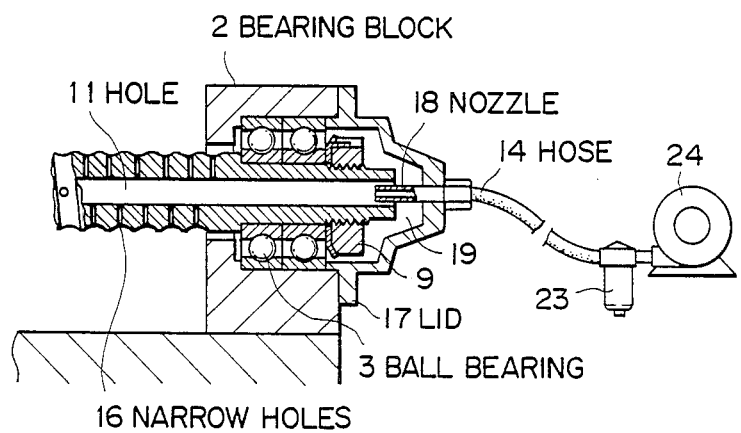
FIG. 3 is a sectional view to partially show the second embodiment of the ball screw apparatus according to this invention.

FIG. 3 is a sectional view to partially show the second embodiment of this invention. In this embodiment, a lid 17 is structured to cover an end of the shaft on the side of the suction hose in so as manner as to leave a space 19 outside the end. The suction hose 14 is connected to the lid 17, a suction nozzle 18 is connected to the inside of the lid 17 and inserted in the hole 11. The suction hose 14 and the suction nozzle 18 are communicated with each other via said lid 17. The hole 11 at the end of the shaft 4 communicates with said space 19 through an interstice around the nozzle 18. In this structure, it is not necessary to connect the shaft 4 with the suction hose 14 by a rotary joint as in the case of the first embodiment, and the dust is sucked from the through hole 11 to the hose 14 via said nozzle 18. The suction hose 14 is connected to a vacuum pump 24 via a filter 23.

Unlike the prior art structure wherein the device is entirely housed in a cover, etc., and dust is sucked from outside via a duct or the like, this invention enables a ball screw apparatus to be structured so as to be compact in size with a cleaning function as the shaft of the apparatus per se functions as a suction duct. This invention allows lubrication with ordinary grease even in a clean-room to eliminate the problem of changing lubrication conditions, effectively prevents contamination of the air by forcibly sucking grease particles which otherwise might be dispersed in the atmosphere into the shaft, prevents faults of ball screw apparatuses which might otherwise be caused by thermal expansion with the cooling effect with the stream of the sucked air, and is highly suitable for ball screw apparatuses of machines and tools installed in a clean room and in semiconductor manufacturing where dust presents critical problems.

Although four narrow holes for sucking the dust are used in the above embodiment and four which are arranged on the cross section of a pitch of the shaft, this invention is by no means limited to that number, it may be any suitable number. The shape of the ball screw nut is also not limited to that illustrated in aforementioned embodiments.

What is claimed as new and desired to be secured by Letters Patent of the United States is:

1. A ball screw apparatus including a ball screw shaft having a spiral groove on the outer surface thereof, a ball screw nut having a spiral groove on the inner surface thereof opposing the spiral groove of said shaft, and a plurality of balls which are engaged within the spiral grooves of said ball screw nut and of said ball screw shaft wherein said ball screw shaft has an axial hollow portion, and a plurality of smaller holes open on the outer periphery of said screw shaft, said smaller holes being communicated with said axial hollow portion, and air sucking means comprising a suction port connected to the axial hollow portion of said shaft so as to apply a negative pressure to the inside of the axial hollow portion.

2. The ball screw apparatus as claimed in claim 1 wherein said smaller holes are formed on the bottom of the spiral groove at a predetermined interval and along the spiral groove of said ball screw shaft.

3. The ball screw apparatus as claimed in claim 1 wherein said air sucking means includes a rotary joint mounted on the end of said ball screw shaft on the side of the air sucking means.

4. The ball screw apparatus as claimed in claim 1 wherein said air sucking means includes a cover which covers the end of said ball screw apparatus on the side of the air sucking means with an interstice, a nozzle which is mounted on said cover and loosely inserted in the axial through hole of said ball screw shaft on the end thereof, and a hose which is secured with said cover and connected to said nozzle.

5. The ball screw apparatus as claimed in claim 1 wherein said air sucking means includes a suction hose with a filter for sucked air.

6. The ball screw apparatus as claimed in claim 1 wherein a plurality of smaller through holes are bored radially on a collar which holds the inner ring of the bearing on the end of said ball screw shaft to rotate with said shaft, a plurality of smaller through holes are bored on the side of the shaft in axial direction on the portion attaching the collar, and the smaller through holes of the collar side and of the shaft side communicate with each other.

7. The ball screw apparatus as claimed in claim 1 wherein said ball screw nuts are formed with a double nut preloaded in the axial direction, and said smaller holes formed on the bottom of the spiral groove of the double nut do not coincide with the part contacting balls on the spiral groove so that rotation of the balls are not disturbed by said smaller holes.

* * * * *